United States Patent Office 3,539,441
Patented Nov. 10, 1970

3,539,441
EMULSIFIABLE COMPOSITIONS
Ronald R. Rabenold, Allison Park, Pa., assignor to PPG Industries, Inc., Pittsburgh, Pa., a corporation of Pennsylvania
No Drawing. Filed Dec. 15, 1967, Ser. No. 690,737
Int. Cl. C08f 45/58, 45/70; D04h 1/64
U.S. Cl. 161—170
17 Claims

ABSTRACT OF THE DISCLOSURE

Emulsifiable compositions comprise a polyester of an ethylenically unsaturated polycarboxylic acid and one or more polyhydric alcohols, a cross-linking polymerizable ethylenically unsaturated monomer, an emulsifier, and a stabilizing amount of an inhibitor system comprising at least one predominantly water-insoluble, polyester resin-soluble, inhibitor and a predominantly water-soluble inhibitor which will prevent gelling of the resins at temperatures greater than about 120° F. Aqueous emulsions of such compositions are used as binders for preforms or glass fiber mats. The preferred polyesters are made from maleic anhydride and phthalic anhydride, and neopentyl glycol, 1,3-butanediol, and polyethylene glycol, with styrene as the cross-linking monomer. The preferred inhibitor system comprises hydroquinone and 2,6-di-tert-butyl-4-methylphenol.

---

Glass fibers are extensively used in reinforcing molded resinous products and in similar applications in which their properties, such as strength and durability, are advantageously utilized. However, in order to make the glass fibers usable in such applications, the fibers must be retained in discrete shapes of fixed dimension until the final molding step. This is ordinarily accomplished by impregnating a mass of the glass fibers with a binder or coating which holds the fibers together in the desired shape.

The binders used heretofore, however, have not been wholly satisfactory either because they cause the fibers to be distributed nonuniformly in the bonded product, or because the bonded product has undesirable characteristics, such as a tendency to discolor when heated and poor adhesion to a coating resin applied thereto, or because the finished products in which the bonded fibers serve as reinforcement have unsatisfactory properties, such as low translucency and/or a tendency to crack. Furthermore, the low stability and similar properties of many binders make them difficult to apply and thus their use requires tedious and carefully controlled conditions to avoid decomposition and discoloration.

The prior art binders are ordinarily applied to the glass fibers in aqueous emulsions. The prior art emulsions containing conventional inhibitors have presented various problems which manifested themselves in the properties of the bound glass fiber mats and preforms.

The uniformity of the emulsion is of critical importance since premature gelling of the resin will produce problems in application as well as unsatisfactory products. Thus, it is necessary to prevent gelation from the time of the thinning of the resin with the ethylenically unsaturated cross-linking monomer, to the time the resin is dried in the glass fibers. The conventional water-insoluble inhibitors employed in emulsion systems present a problem in that they are poor inhibitors at temperatures above about 120° F. This is critical since this temperature and higher in necessary for processing the polyester resin, that is, thinning the polyester resin with the polymerizable ethylenically unsaturated monomer.

The tendency of the resin to color upon being heated is another of the more pressing problems in the manufacture of glass fiber mats and preforms. For many commercial purposes a light color is needed. It is found that when the amount of the inhibitors used in the resin is large, the resin has a tendency to discolor upon being heated. Also, in the same sense, a large amount of inhibitor in the resin makes it more difficult to cure the resin on the glass fibers when the emulsion is broken. Hence, it is desirable to use only the amount of inhibitors as is necessary to prevent gelation, as any excess inhibitor present produces undesirable results. The ordinary inhibitors employed in emulsions are more polyester resin-soluble than water-soluble and require that an excess of inhibitor be present in the resin phase and the water in order to provide sufficient inhibitor to inhibit the water phase. In the case of an inhibitor which is more water-soluble than polyester resin-soluble, such as hydroquinone, the reverse is true and still an excess of inhibitor is needed.

The present invention provides emulsifiable polyester resin compositions which do not gel during any ordinary handling steps, and which provide a suitable level of inhibition both in the resin phase and in the water phase, without any problems of discoloration and difficulty in curing the resin after the emulsion has been broken.

The emulsifiable compositions of this invention comprise conventional unsaturated polyester resins. Such polyesters are ordinarily made from an acid component comprised of an ethylenically unsaturated carboxylic acid and, optionally, a member selected from the group consisting of saturated dicarboxylic acid and aromatic dicarboxylic acids (i.e., acids which are aromatically unsaturated only), and one or more polyhydric alcohols. The polyester is combined with a polymerizable ethylenically unsaturated monomer, an inhibitor system containing at least one predominantly water-insoluble, polyester resin-soluble inhibitor and at least one predominantly water-soluble inhibitor which will prevent gelling of the resin at temperatures greater than 120° F., and an emulsifier.

The above compositions are formed by cooking an ethylenically unsaturated polycarboxylic acid and, if desired, a saturated dicarboxylic acid or an aromatic dicarboxylic acid, with a polyhydric alcohol or alcohols, preferably including polyethylene glycol in the presence of an esterification catalyst, and mixing the polyester thus formed with a polymerizable ethylenically unsaturated monomer. An emulsifier and a stabilizing amount of the inhibitor system may be added at any time, but the inhibitor is preferably added immediately after the polyester has been cooked and before the cross-linking monomer is added.

The ethylenically unsaturated polycarboxylic acids used in forming the polyester may include such acids as maleic acid, fumaric acid, aconitic acid, mesaconic acid, citraconic acid, itaconic acid, and halo- and alkyl-derivatives of such acids, and the like. The preferred acid is maleic acid. The anhydrides of these acids, where the anhydrides exist, are of course embraced under the term "acid" since the polyesters obtained therefrom are essentially the same whether the acid or anhydride is utilized in the reaction.

Saturated dicarboxylic acids and aromatic dicarboxylic acids are often utilized in combination with the unsaturated acid or anhydride in the preparation of unsaturated polyester resins. Such acids increase the length of the polyester chain without adding additional cross-linking sites, which is a desired feature in some polyesters. Examples of useful saturated and aromatic dicarboxylic acids include succinic acid, adipic acid, suberic acid, azelaic acid, sebacic acid, phthalic acid, isophthalic acid, terephthalic acid, tetrachlorophthalic acid, hexachloro-endomethylene tetrahydrophthalic acid, and the like. As in the case of the ethylenically unsaturated acids, the anhydrides of these acids, where the anhydrides exist, are included in the term "acid."

The ethylenically unsaturated dicarboxylic acids are conventionally employed in an amount of about 10 mole percent to 100 mole percent of the acid component of the polyester, although preferably the ethylenically unsaturated dicarboxylic acids comprise from about 10 mole percent to about 50 mole percent of the acid, with the rest being a saturated dicarboxylic acid and/or an aromatic dicarboxylic acid.

Some polyhydric alcohols useful in preparing unsaturated polyester resins include ethylene glycol, diethylene glycol, polyethylene glycol, propylene glycol, dipropylene glycol, polypropylene glycol, glycerol, neopentl glycol, pentaerythritol, trimethylolpropane, trimethylolethane, 1,3-butanediol, and the like. The preferred polyols for the purpose of this invention have a molecular weight of less than about 2,000 and consist of carbon, hydrogen and oxygen. The polyhydric alcohols are generally employed in an equal molar ratio to the total acid components or as a slight excess as, for example, about 5 mole percent excess.

The polyester is formed by heating the polycarboxylic acid component and polyhydric alcohol component to a temperature of from about 150° C. to about 300° C. under an inert gas until water of reaction substantially ceases to evolve, or until the mixture has reached a reasonably low acid value (e.g., 5 to 50). As previously mentioned, an esterification catalyst may be added to speed up the reaction. Any esterification catalyst may be used. Examples are $Bu_2SnO$, $SnCl_2$, $SnF_2$, $BuSn(OH)_3$, $BuSnCl_3$, and the like. The amount of catalyst is not critical, but generally the reaction mixture contains approximately 0.1 to 0.5 percent by weight of catalyst.

Also, as mentioned above the polyhydric alcohol component of the polyester often includes a polyethylene glycol which imparts a better capacity for emulsification with water. Any polyethylene glycol may be used, preferably having a relatively high molecular weight. Numerous polyethylene glycols suitable for incorporation in the polyester are available commercially. For example, a satisfactory series is sold under the trade name of Carbowaxes. The Carbowaxes are understood to be polyethylene glycols (or mixtures of polyethylene glycols) having average molecular weights of about 1,000 or above but below about 6,000, and those containing materials having average weights between 1,000 and 2,000 are especially suitable for application in the practice of the present invention. Many polyethylene glycols are obtained by condensation of ethylene oxide, and contain some hydroxyl groups which are capable of reaction with any carboxyl groups available in the polybasic acid or the polyester molecules. Generally the polyethylene glycol constitutes about 2 to about 10 mole percent of the polyhydric alcohol component, although the amount used is not critical.

Preferably the inhibitor system is added to the polyester after the esterification reaction and before the addition of the cross-linking monomer. The inhibitor system contains at least one predominantly water-insoluble polyester resin-soluble inhibitor and at least one predominantly water-soluble inhibitor which will prevent gelling of the resin at temperatures greater than 120° F.

Examples of predominantly water-insoluble, polyester resin-soluble inhibitors that may be used are highly substituted phenols, such as 2,6-ditertiary-butyl-4-methyl phenol; catechols, such as catechol and t-butyl catechol; highly substituted hydroquinones and quinones, such as 2,5 - ditertiary - butyl - hydroquinone, 2,5 - ditertiary-butylquinone, 2,5-dimethyl-hydroquinone, and 2,5-dimethyl-quinone; and the like. Broadly speaking, the inhibitor The emulsifiable compositions may be added to water over a relatively wide range of proportions, such as may be described as one which is much less water-soluble than polyester resin-soluble.

Examples of predominantly water-soluble inhibitors which prevent gelling of the resin at higher tempeatures are hydroquinone, quinone, the lower substituted quinones and hydroquinones such as monomethyl hydroquinone and monomethyl quinone and the halogenated compounds of these classes, such as mono and dichloro quinone and hydroquinone and the like. The requirement for these inhibitors is that they are more soluble in water than in the polyester resin.

The total amount of inhibitors used generally is small, usually comprising from about 0.002 to about 0.3 per cent of the total weight of the polyester resin and the cross-linking monomer mixture. Depending upon the type of resin used, the water-soluble inhibitor may constitute from about 20 to about 80 weight percent of the inhibitor system.

The polymerizable ethylenically unsaturated monomers which cross-link with the unsaturated polyesters to form thermosetting materials include monomers such as styrene, alpha-methyl styrene, divinyl benzene, vinyl acetate, allyl acetate, diallylphthalate, diallyl succinate, diallyl adipate, diallyl sebacate, methyl acrylate, methy methacrylate, hexyl acrylate, octyl acrylate, octyl methacrylate, diallyl itaconate, diallyl maleate, diallyl fumarate, triallyl cyanurate, and the like. The preferred monomers are liquid compounds soluble in the polyester component. Such monomers could preferably be free of non-aromatic carbon to carbon conjugated double bonds.

The monomer component or components may be employed over a broad range of proportions, but usually on a weight basis the amount of monomer is less than the polyester component. The amount of monomer is generally sufficient to provide a liquid, flowable interpolymerizable mixture. Ordinarily, the percentage of monomer will fall within the range of about 10 percent to about 60 percent by weight of the total mixture of polyester and monomer. In the preferred compositions, the monomer is present in an amount of about 20 percent to about 50 percent.

Since the polyester components of the interpolymerizable mixture are often highly viscous or even solid at ambient temperatures, it is preferred to add the monomers thereto at a temperature sufficient to render the polyester satisfactorily fluid for incorporation with the monomer. This temperature is usually in the range of about 180° C. mature gelation in the absence of gelation inhibitors, upon to about 220° C., which is sufficiently high to induce preintroduction of the monomer into the system.

For purposes of increasing the speed of copolymerization of the mixture, a catalyst such as a free radical type catalyst is usually added to the liquid mixture of polyester and the monomer. These catalysts include benzoyl peroxide, cumene hydroperoxide, lauryl peroxide, or any of the conventional peroxidic or similar catalysts of addition reaction. The catalyst should be added to the copolymerizable mixtures while they are relatively cool in order to obviate any undue tendency to premature gelation.

The emulsifier used with the polyester can be any surfactant material compatible with the other components, and can be added at any time prior to emulsification. Many such emulsifiers are well known in the art, some examples being polyethylene oxide esters of various acids, both organic and inorganic salts of long chain amines and many others. The preferred emulsifiers are acidic phosphate esters. These materials are sold commercially under the trade name "Gafac."

The polyester resin mixture with the cross-linking monomer may contain from 1 to 10 weight percent of the emulsifier. The foregoing polymerizable material can be emulsified with water by simple agitation at normal room temperature.

amounts so as to provide emulsions of about 2½ to 50 or 60 percent nonvolatile solids content, based upon the total emulsion mixture. Especially favorable results are obtained in the preparation of stock emulsions by the incorporation of approximately equal parts by weight of water and emulsifiable mixture. Such emulsions are stable for several weeks and they can then be diluted to spraying consistency or such other consistency as may be desired by the addition of water. Mixtures of about 10 percent by weight solids content are found to be very satisfactory for spraying purposes and are also quite stable.

The emulsions of this invention may be used for various coating operations. For example, they may be used to impregnate various porous materials, such as metal castings. A particular utility of these emulsions is their use as bonding agents for fibrous mats or preforms, made from glass fibers or similar fibrous materials. Using these emulsion binders, the resulting fiber-reinforced product achieves superior surface properties and excellent color.

The mat to which the emulsion is applied as a binder may be formed of loose and random or arranged fibers, such as short lengths of glass fibers, that provide a highly permeable body. Within the broader concepts of this invention, any convenient method of forming a mate or preform, such as by spreading out a loose bat upon a support, may be employed. However, a preferred and advantageous method involves passing a current of gas (for example, air) carrying the fibers suspended therein throughout a foraminous form to collect the fibers at random thereupon.

The emulsion can be applied to the fibers upon the form by an immersion process, followed by draining or otherwise removing any excess liquid. However, the emulsion of copolymerizable polyester and monomer preferably is supplied to the fibers by spraying, for example, while the fibers are supported upon a mold or form designed to assist in maintaining it in a desired shape. Subsequently, the mat or preform is dried and cured, preferably in the absence of mechanical pressure, for example, by baking it in an oven heated to the curing temperature while a gaseous medium such as air is circulated through the oven for purposes of removing water vapor. The resultant dried products are highly porous and, as previously stated, contain fibers bonded firmly together at points of interception, even at points relatively deep in the mat, owing to the tendency of the emulsion to run along the fibers and collect at any points of contact between contiguous fibers. The remaining portions of the fibers have only thin films of the binder.

The emulsion binder and the glass fibers may also be sprayed on to a shaped screen at the same time utilizing an air current to pull the binder and fibers against the screen. After drying and curing, the fibers then retain the shape of the form. This method is that usually employed to make preforms to be used as reinforcement for resin products.

The mats or preforms are highly porous throughout and readily can be impregnated with thermosetting resins which, when cured, forms a solid reinforced resin. This is generally done by stripping the mat or preform from the screen and placing it in a mold. The liquid thermosetting resin-forming material is poured onto the glass fiber mat or preform and forced into the interstices of the mat or preform. The impregnating material is then cured to produce the finished reinforced article. The impregnating resin may be a thermosetting resin such as an unsaturated polyester resin or epoxy resin.

As mentioned above, the glass fiber products of this invention do not discolor. For instance, a conventional polyethylene glycol-modified polyester binder discolors badly at 350° F. in 10 minutes or less, a temperature and time often encountered during production processes, but the binders of the present invention are not visibly affected by such treatment. This permits the use of treated glass fiber products in producing, for example, light or pastel colored pigmented moldings where the techniques used subject the bonded product to high temperatures.

The bound glass fiber products of this invention also have highly advantageous surface properties, which provide molded products with minimal surface defects. This permits them, for example, to be used in automobile bodies and similar articles which may be painted, and which require a smooth, glossy surface.

It is further noted that best results are obtained using maleic acid (or anhydride) in the acid component of the polyester, as this provides a harder cured resin, and the use of neopentyl glycol as one of the polyhydric alcohols is desirable as it minimizes any discoloration of the baked film. In many cases, 1,3-butanediol is preferably employed along with neopentyl glycol, e.g., as about 20 mole percent of the polyhydric alcohol component. It has been found that 1,3-butanediol reduces the tendency of the neopentyl glycol polyester to crystallize, without deleteriously affecting the color. It is also preferable to use a polyethylene glycol as one of the polyhydric alcohols.

The following examples set forth specific embodiments of the instant invention. However, the invention is not to be construed as being limited to these embodiments for there are, of course, numerous possible variations and modifications.

All parts and percentages in the examples, as well as throughout the specification, are by weight unless otherwise indicated.

EXAMPLE I

An unsaturated polyester was prepared as follows: A vessel was charged with 15.50 parts of phthalic anhydride, 3.42 parts of maleic anhydride, 11.6 parts of neopentyl glycol, 2.51 parts of 1,3-butanediol, and 6.98 parts of polyethylene glycol (Carbowax 1540 W). To this mixture, 0.04 part of dibutyl tin oxide was added and the mixture heated to 210° C. until the Gardner-Holdt viscosity was I-J.

Seventy parts of the above polyester were charged into a vessel and cooled to 155° C. and 0.005 part of hydroquinone was added. After the mixture had cooled to 120° C. 0.01 part of 2,6-di-tert-butyl-4-methylphenol and 30 parts of styrene were added. When the mixture had cooled to room temperature, 3 parts of an acidic phosphate ester (Gafac RE–610) were added. The resultant composition had a viscosity of about 2,000 cps.

EXAMPLE II

One hundred parts of the composition of Example I were mixed with 1 part of benzoyl peroxide. One hundred parts of water were added slowly while agitating the emulsion until the emulsion inverted. Then 800 parts of water were added. The resultant emulsion was stable for over a month.

EXAMPLE III

The emulsion of Example II was sprayed concurrently with chopped glass onto a flat 30" x 30" preform screen. The glass fiber mass was then dried and cured at 310° F. for 5 minutes. The resultant preform was white and was well bound.

EXAMPLE IV

A fiberglass reinforced plastic product was formed by impregnating the preform of Example III with 100 parts of a propylene maleate phthalate resin, 0.8 part benzoyl peroxide and 60 parts of calcium carbonate in a panel mold at a temperature of 250° F. and under a pressure of 100 p.s.i. for 3 minutes. The resulting fiberglass reinforced plastic product showed an excellent surface with minimal fiber pattern and had a uniformity light color.

According to the provisions of the patent statutes, there are described above the invention and what is considered its best embodiments. However, within the scope of the appended claims, it is to be understood that the invention may be practiced otherwise than as specifically described.

I claim:
1. An emulsifiable composition comprising
 (1) from about 50 percent to about 90 percent by weight, based on the total composition, of a polyester of
   (a) an acid component comprising
    (1) about 10 mole percent to about 100 mole percent of ethylenically unsaturated polycarboxylic acids or anhydrides, and
    (2) about 0 mole percent to about 90 mole percent of at least one member selected from the group consisting of saturated dicarboxylic acids or anhydrides and aromatic dicarboxylic acids or anhydrides, and
   (b) one or more polyhydric alcohols;
 (2) from about 10 percent to about 50 percent by weight, based on the total composition, of polymerizable ethylenically unsaturated monomer; and
 (3) a stabilizing amount of an inhibitor system consisting essentially of
   (a) at least one predominantly water-insoluble, polyester resin-soluble inhibitor, and
   (b) at least one predominantly water-soluble inhibitor which will prevent gelling of the resin at temperatures greater than 120° F.

2. The emulsifiable resin of claim 1 including an emulsifier.

3. The emulsifiable resin of claim 2 wherein the emulsifier is an acidic phosphate ester.

4. The emulsifiable resin of claim 1 wherein the acid component of the polyester comprises from about 10 mole percent to about 50 mole percent of maleic anhydride and about 50 mole percent to about 90 mole percent of phthalic anhydride.

5. The emulsifiable resin of claim 1 wherein the polyhydric alcohol comprises from about 50 mole percent to 90 mole percent neopentyl glycol, and from about 10 mole percent to about 50 mole percent of 1,3-butanediol.

6. The emulsifiable resin of claim 4 wherein the polyhydric alcohol contains from about 2 to about 10 mole percent of a polyethylene glycol having an average molecular weight above about 1,000 and below about 6,000.

7. The emulsifiable resin of claim 1 wherein the ethylenically unsaturated monomer is styrene.

8. The emulsifiable resin of claim 1 wherein the predominantly water-insoluble, polyester resin-soluble inhibitor is 2,6-di-tert-butyl-4-methyl phenol.

9. The emulsifiable resin of claim 1 wherein the predominantly water-soluble inhibitor is hydroquinone.

10. The aqueous emulsion formed by adding water to the emulsifiable resin of claim 1.

11. A glass fiber mat or preform comprising glass fibers bound together with a binding resin formed by drying the aqueous emulsion of claim 8.

12. The glass fiber mat or preform of claim 11 wherein the emulsifier is an acidic phosphate ester.

13. The glass fiber mat or preform of claim 11 wherein the polyester resin comprises from about 10 mole percent to about 52 mole percent of maleic anhydride and from about 50 mole percent to about 90 mole percent of phthalic anhydride.

14. The glass fiber mat or preform of claim 11 wherein the polyhydric alcohol comprises from 50 mole percent to 90 mole percent neopentyl glycol and from 10 mole percent to 50 mole percent of 1,3-butanediol.

15. The glass fiber mat or preform of claim 14 wherein the polyhydric alcohol contains from about 2 to about 10 mole percent of polyethylene glycol.

16. The glass fiber mat or preform of claim 11 wherein the ethylenically unsaturated monomer is styrene.

17. A glass fiber reinforced thermosetting product comprising glass fibers bound together with the binder resin of claim 1 and impregnated in a mold with a thermosetting resin which is subsequently cured.

References Cited
UNITED STATES PATENTS

| | | | |
|---|---|---|---|
| 2,443,735 | 6/1948 | Kropa | 260—866 XR |
| 2,855,373 | 10/1958 | Guenther | 260—29.6 |

HAROLD ANSHER, Primary Examiner

D. J. FRITSCH, Assistant Examiner

U.S. Cl. X.R.
117—126; 260—29.6